(12) United States Patent
Lin

(10) Patent No.: US 9,886,851 B2
(45) Date of Patent: Feb. 6, 2018

(54) REAL TIME NOTIFICATION AND CONFIRMATION SYSTEM AND METHOD FOR VEHICLE TRAFFIC VIOLATION

(71) Applicant: Shihao Lin, Shenzhen (CN)

(72) Inventor: Shihao Lin, Shenzhen (CN)

( * ) Notice: Subject to any disclaimer, the term of this patent is extended or adjusted under 35 U.S.C. 154(b) by 301 days.

(21) Appl. No.: 14/741,450

(22) Filed: Jun. 17, 2015

(65) Prior Publication Data

US 2015/0302744 A1 Oct. 22, 2015

Related U.S. Application Data

(63) Continuation-in-part of application No. PCT/CN2013/085296, filed on Oct. 16, 2013.

(30) Foreign Application Priority Data

Sep. 18, 2013 (CN) .......................... 2013 1 0429720

(51) Int. Cl.
| | |
|---|---|
| *G08G 1/01* | (2006.01) |
| *H04L 12/64* | (2006.01) |
| *G08G 1/017* | (2006.01) |
| *G08G 1/054* | (2006.01) |
| *G08G 1/0967* | (2006.01) |
| *G06Q 50/18* | (2012.01) |

(52) U.S. Cl.
CPC ......... *G08G 1/0137* (2013.01); *G08G 1/0175* (2013.01); *G08G 1/054* (2013.01); *G08G 1/096716* (2013.01); *G08G 1/096741* (2013.01); *G08G 1/096775* (2013.01); *H04L 12/6418* (2013.01); *G06Q 50/18* (2013.01)

(58) Field of Classification Search
CPC .... G08B 1/0137; G08B 1/0175; G08B 1/054; G08B 1/096741; G08B 1/096775; H04L 12/6418
USPC ........................................................ 340/933
See application file for complete search history.

(56) References Cited

U.S. PATENT DOCUMENTS

| | | | | |
|---|---|---|---|---|
| 6,085,976 A | * | 7/2000 | Sehr | ........................ G06Q 10/02 |
| | | | | 235/380 |
| 6,914,541 B1 | * | 7/2005 | Zierden | .................. G08G 1/052 |
| | | | | 340/933 |
| 2004/0049476 A1 | * | 3/2004 | Sai | ..................... G06F 17/30575 |

(Continued)

*Primary Examiner* — Omar Casillashernandez
(74) *Attorney, Agent, or Firm* — Wayne & Ken, LLC; Tony Hom

(57) ABSTRACT

The present invention discloses a real time notification and confirmation system and method for vehicle traffic violations. The system includes a user terminal device, an electronic police device, a traffic control center. The traffic control center analyzes, determines and stores the suspected violation information uploaded by the electronic police device and the identification information inputted by the user terminal device into the database of the traffic control center. The traffic control center sends related notification and an alert message to the user terminal device based on the analysis and determination result. The invention enables a driver to acquire an on-the-spot traffic violation record, a timely warning, correction, and effectively exercising his rights to be heard and defending himself/herself. The present invention helps the traffic control center to timely determine the real violator and prevent a driver from blaming others to take the punishment instead of himself/herself.

2 Claims, 4 Drawing Sheets

(56) References Cited

U.S. PATENT DOCUMENTS

2006/0214783 A1* 9/2006 Ratnakar .............. G08G 1/0175
340/505
2006/0287807 A1* 12/2006 Teffer ................... G08G 1/0175
701/117
2012/0116661 A1* 5/2012 Mizrachi ................ G06Q 10/10
701/300
2013/0215273 A1* 8/2013 Kareev ................. H04N 7/183
348/149
2013/0335241 A1* 12/2013 Kissell ................. G08G 1/0175
340/936

* cited by examiner

REAL TIME NOTIFICATION AND CONFIRMATION SYSTEM AND METHOD FOR VEHICLE TRAFFIC VIOLATION

CROSS-REFERENCE TO RELATED APPLICATIONS

This application is a continuation-in-part of International Patent Application No. PCT/CN2013/085296 with an international filing date of Oct. 16, 2013, designating the United States, and further claims priority benefits to Chinese Patent Application No. 201310429720.5 filed Sep. 18, 2013. The contents of all of the aforementioned applications, including any intervening amendments thereto, are incorporated herein by reference.

TECHNICAL FIELD

The present invention relates to an automatic processing technology of traffic violations, in particular to a system and method of real time notification and confirmation for vehicle traffic violations.

BACKGROUND OF THE PRESENT INVENTION

With the development of modern society, the importance of vehicle traffic control is increasingly prominent. The law enforcement mode that traffic police investigate and prosecute traffic violation behaviors on the spot has been powerless obviously for a long time, and it is difficult to fundamentally suppress the trend of frequent traffic violation behaviors. Electronic police systems widely applied in the current road traffic control, as a modernized means for offsite law enforcement, have extended and developed an automatic monitoring and recording technology for the overall process of multiple violation phenomena such as overspeed, retrogradation, driving without following lanes, rolling on the markings and the like on the basis of the earliest shooting device for red light violations; through the technologies of remote image transmission, databases and the like, the law enforcement department can use recorded images as ample evidence for vehicle violations and can investigate and punish the traffic violation behaviors of vehicles and drivers later so that the strength of all-weather and full-coverage road traffic supervision for vehicle traffic violation behaviors is greatly increased.

At present, with the progress of modern science and technology, all kinds of electronic police systems emerge in an endless stream and change with each passing day. However, such offsite law enforcement system and method as electronic police still have many deficiencies. For example: The success rates of license plate identification, data acquisition and violation confirmation should be improved; the function is single; modules are dispersed; generated ticketing efficiency is low; and time lags are long. It is difficult for parties to effectively know traffic violation records on the spot, so the parties cannot be warned, corrected and educated in time. If the parties are unconscious without knowing these, it is also possible to result in repeated traffic violations and accumulated huge fines. The hysteresis of violation information transfer makes it difficult to effectively exercise their lawful rights of statement and argument if the parties cannot remember violation and concrete details because the affair is over and the situation has changed. Facing accompanying administrative punishment, the parties often have great resistance emotion. Economic punishment which is made by excessively depending on the violation records shot during offsite law enforcement by the electronic police fosters bad working styles of the management department, such as simple law enforcement, earning by fines and the like. What is recorded during offsite law enforcement is the fact of vehicle violations, but it is difficult to confirm a specific driver who breaks the law. It is often the case that the driver who breaks the law finds a substitute to accept the punishment, known as "buying points", in order to evade deduction of points, huge fines, training and even license suspension.

Generally speaking, the electronic police needs to extract audio-visual material formed by the violation behaviors; and if the audio-visual material is correct after manual review, it will become the evidence of administrative punishment. Then, the traffic police will impose administrative punishment on the violation behaviors according to the regulation of Road Traffic Safety Law. If the driver cannot be determined, an owner or manager of an illegal vehicle will be punished in accordance with the law. In accordance with the violation behavior records shot by the electronic police and the like, the traffic control department should notify an actor, who breaks the law, of the time and the place of accepting the punishment in the modes of short messages, telephones and the like within 15 days from the date of occurrence of violation behaviors of road traffic safety. If the parties fail to accept the punishment in an appointed place within a time limit, they will be notified in the mode of posting written notices or announcement. Because most of the current violation data needs to be manually examined and differentiated, administrative punishment notices cannot be delivered generally within the above legal time limit. In addition, the traffic control department is responsible for the present electronic police devices for offsite law enforcement. Due to the lack of technology, for some legal disposals (for example, the violation behaviors are indicated in time and the parties are released after oral warning and the like) where the circumstance is minor, not affecting road traffic, adequate technical support cannot be provided.

Therefore, the present automatic processing system for vehicle traffic violations has been unable to meet the requirement of social development, and innovations and improvements should be made.

SUMMARY OF THE PRESENT INVENTION

A technical problem to be solved by the present invention is to provide a system and method of real time notification and confirmation for vehicle traffic violations, which not only can enable the parties to know the traffic violation records on the spot, to be warned, corrected and educated in time and to effectively exercise their rights of statement and argument, but also can enable the traffic control department to confirm the specific driver breaking the law as soon as possible, to prevent the condition of finding the substitute to accept the punishment from occurring, to be more people-oriented, to enhance the consciousness, the initiative and the traffic safety legal awareness of complying with traffic regulations for traffic participants, to form a favorable traffic atmosphere, to prevent road traffic violations and traffic accidents from occurring, and to achieve the effects of effective management and suppression on the traffic violation behaviors.

To solve the above technical problem, the present invention proposes a system of real time notification and confirmation for vehicle traffic violations, comprising user terminal devices, electronic police devices and a traffic control center, wherein the user terminal devices are used for inputting the identification information of the driver, the vehicle owner and the vehicle; then, the identification information is uploaded to the traffic control center by a network communication system for performing registration or cancellation; after the suspected vehicle violation information sent by the traffic control center is received and displayed, the information to be understood, appealed or confirmed is fed back to the traffic control center;

the electronic police devices are used for monitoring and evidencing the illegal passing vehicle and then uploading the suspected violation information obtained by the network communication system to the traffic control center;

and the traffic control center has a background service computer center and a database, used for receiving, storing, analyzing and judging the suspected vehicle violation information uploaded by the electronic police devices and the identification information registered or cancelled by the user terminal devices and sending related notification, reminding and evidencing information to the user terminal devices according to the analysis and judgment condition.

Further, each user terminal device comprises a central processing unit, and a first communication module, an information input module, an information display module and a voice broadcast module which are respectively connected with the central processing unit, wherein the first communication module is used for receiving and sending the information; the information input module is used for inputting text, voice and image information; and the information display module is used for displaying text and image information.

Further, each user terminal device also comprises a user identity information card on which the identification information of the driver and the vehicle owner is recorded, and the information input module reads the identification information recorded on the user identity information card and then uploads the identification information to traffic control center for performing registration or cancellation.

Further, the first communication module adopts any one of a fiber-optic network module, an ADSL wired network module. GPRS/CDMAIX or a wireless communication module of other channels for communication so as to upload the identification information to the traffic control center to perform registration or cancellation.

Further, each electronic police device comprises a shooting apparatus, a factory control host, and an image processing module, a candid shooting module, a vehicle license identification module and a second communication module which are respectively connected with the factory control host, wherein the shooting apparatus is connected with the image processing module.

Further, each electronic police device also comprises an auxiliary light source and an auxiliary light source control module which is connected with the factory control host, wherein the auxiliary light source is connected with the auxiliary light source control module.

Further, the second communication module adopts any one of the fiber-optic network module, the ADSL wired network module, GPRS/CDMAIX and the wireless communication module of other channels for communication so as to upload the obtained suspected violation information to the traffic control center.

To solve the above technical problem, the present invention further proposes a method of real time notification and confirmation for vehicle traffic violations, comprising the following steps:

1. The identification information of the driver, the vehicle owner and the vehicle is inputted by the user terminal devices; then, the identification information is uploaded to the traffic control center by the network communication system for performing registration or cancellation.

2. The electronic police devices monitor and evidence the illegal passing vehicle and then upload the suspected violation information obtained by the network communication system to the traffic control center.

3. The traffic control center performs matching and contrastive analysis on the received suspected violation information and the identification information of the vehicle through the background service computer center without the need of manual review, transmits the obtained suspected violation information of the suspected illegal vehicle to registered user terminal devices in real time, and records the suspected violation information into a database.

4. After the user terminal devices receive the suspected vehicle violation information, the driver and/or the vehicle owner feed(s) back the information to be understood, appealed or confirmed to the traffic control center and the traffic control center records and stores the feedback information replied by the user terminal devices into the database.

Further, the step 3 also comprises: the traffic control center contrasts and judges the information of the driver and the information of the vehicle owner. If the information of the driver is the same as the information of the vehicle owner, the traffic control center sets the user terminal devices as a convenient operating function. If the information of the driver is different from the information of the vehicle owner, the traffic control center notifies the driver and the vehicle owner of the suspected violation information through a corresponding communication system and records corresponding information into respective databases of the driver and the vehicle owner.

Further, the step 4 also comprises: the traffic control center records and stores ail kinds of information replied by the driver and the vehicle owner into the databases and the databases are mutually linked with the related violation case information to be processed.

The above technical solutions at least have the following beneficial effects: in the present invention, by adopting the user terminal devices, the identification information of the driver, the vehicle owner and the vehicle is inputted; then, the identification information is uploaded to the traffic control center through the network communication system; the suspected violation information sent by the traffic control center is received and displayed; the information to be understood, appealed or confirmed is fed back to the traffic control center at safe and convenient time; the illegal passing vehicle is monitored and evidenced through the electronic police devices and then the obtained suspected violation information is uploaded to the traffic control center through the network communication system; the suspected violation information uploaded by the electronic police devices and the identification information inputted by the user terminal devices are analyzed and judged through the traffic control center, and are stored into the database of the traffic control center; and meanwhile the related information of notification, reminding, evidencing and the like is sent to the user terminal devices according to the analysis and judgment condition. It not only can enable the parties to know the traffic violation records on the spot, to be warned, corrected and educated in time and to effectively exercise their rights of statement and argument, but also can enable the traffic control department to confirm the specific driver breaking the law as soon as possible, to prevent the condition of finding the substitute to accept the punishment from occurring, to be more people-oriented, to enhance the consciousness, the initiative and the traffic safety legal awareness of complying with traffic regulations for traffic participants, to form a favorable traffic atmosphere, to prevent road traffic violations and traffic accidents from occurring, and to improve the comprehensive effects of real time, interaction and legality for effective management and automatic processing on the traffic violation behaviors.

DETAILED DESCRIPTION OF THE PRESENT INVENTION

It should be explained that if there is no conflict, the embodiments in the present application and the features in the embodiments can be mutually combined. The present invention will be further described as below with reference to the drawings.

Figure 1:
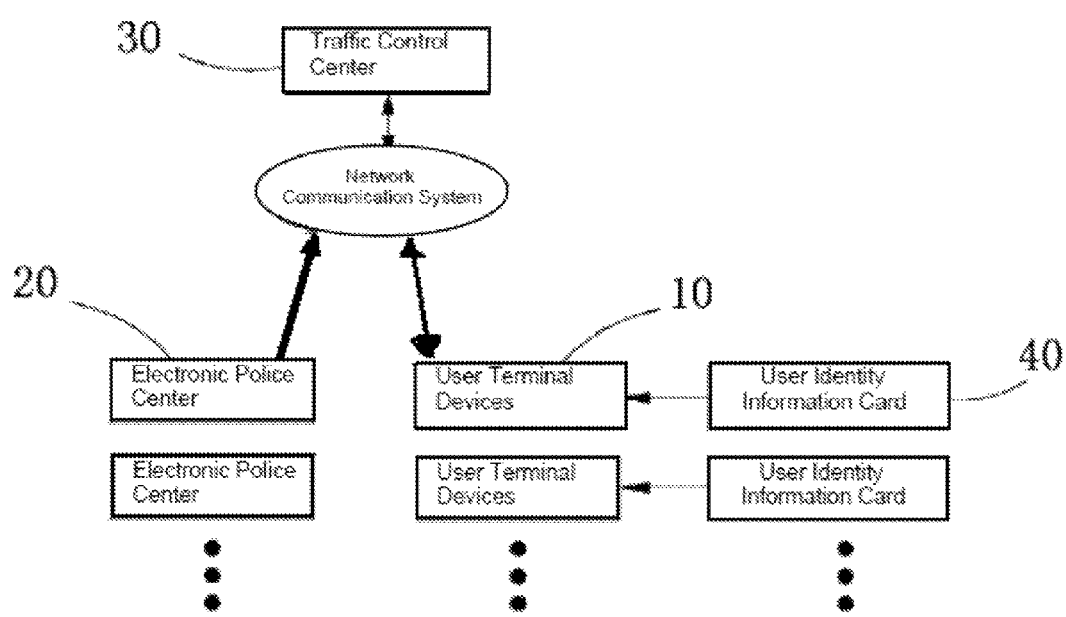
FIG. 1 is a principle block diagram of a system of real time notification and confirmation for vehicle traffic violations according to the present invention.
Figure 2:
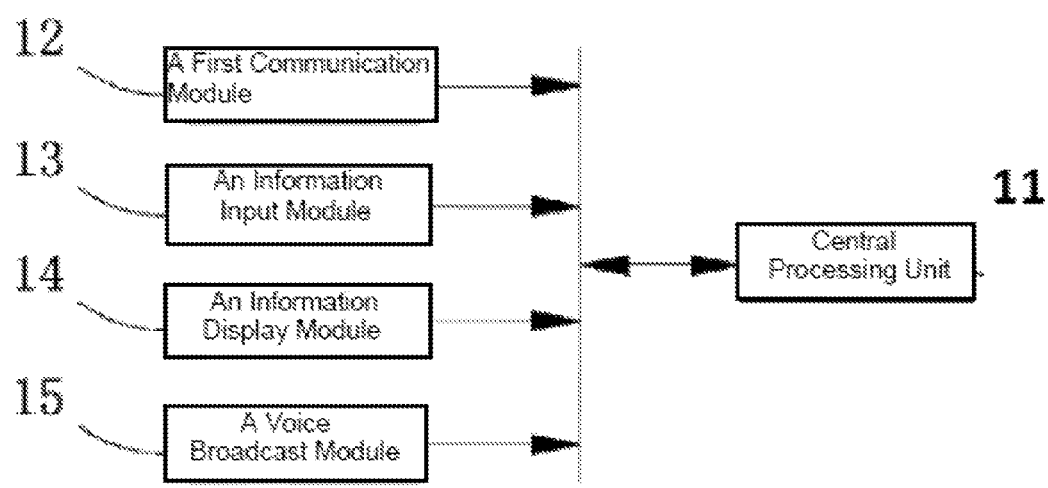
FIG. 2 is a principle block diagram of user terminal devices in the system of real time notification and confirmation for vehicle traffic violations according to the present invention.
Figure 3:
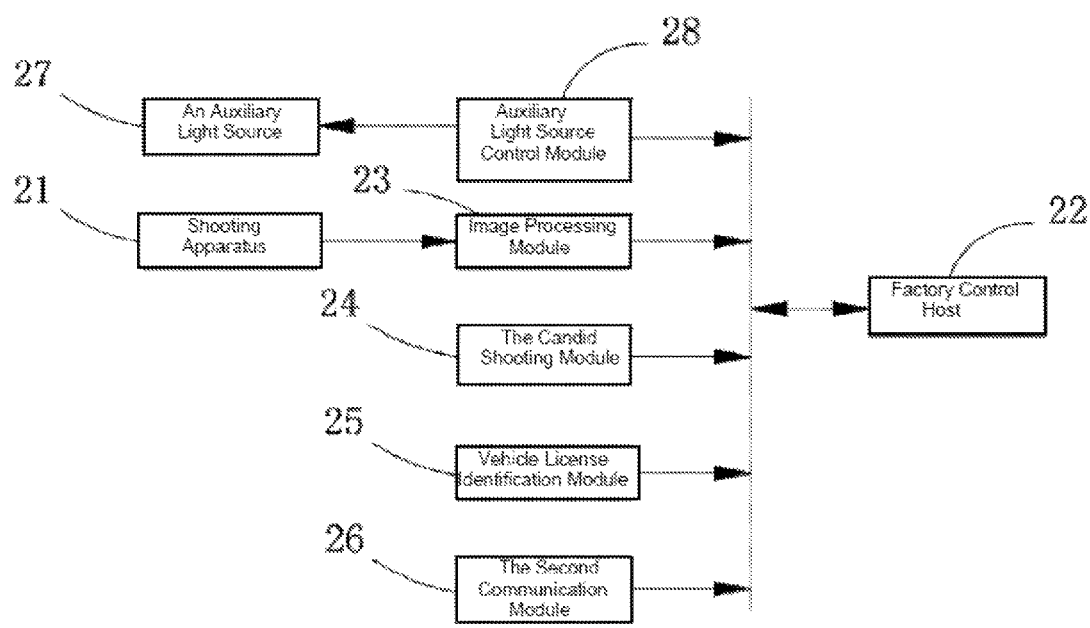
FIG. 3 is a principle block diagram of electronic police devices in the system of real time notification and confirmation for vehicle traffic violations according to the present invention.

1. As shown in FIG. 1 to FIG. 3, the system of real time notification and confirmation for vehicle traffic violations in embodiment 1 of the present invention comprises user terminal devices 10, electronic police devices 20 and a traffic control center 30, wherein:

The user terminal devices 10 are used for inputting the identification information of the driver, the vehicle owner and the vehicle, then uploading the identification information to the traffic control center 30 by the network communication system for performing registration or cancellation, and receiving and displaying the related notification, reminding and evidencing information sent by the traffic control center 30. Specifically, the identification information refers to all kinds of data, including the identity information of the driver, the name and the company of the vehicle owner, license plate information and the like, and can be formulated according to the requirements of the traffic control department, not limited herein. Each user terminal device 10 comprises a central processing unit 11, and a first communication module 12, an information input module 13, an information display module 14 and a voice broadcast module 15 which are respectively connected with the central processing unit 11, wherein the first communication module 12 is used for receiving and sending the information; the information input module 13 is used for inputting the information of text, voice, image and the like; and the information display module 14 is used for displaying the information of text, voice, image and the like. In the implementation process, the first communication module 12 can adopt any one module of a fiber-optic network module, an ADSL wired network module, GPRS/CDMAIX or a wireless communication module of other channels for communication so as to upload the identification information to the traffic control center 30 to perform registration or cancellation. The user terminal devices 10 can be used for the driver and the vehicle owner for manager) to perform information transfer to the background service computer center of the traffic control center 30 in one of the modes of text, voice, image and the like or a combination of these. The background service computer center of the traffic control center 30 can perform warning and information transfer to the driver and the vehicle owner (or manager) through the user terminal devices 10 in one of the modes of sound, light, text, voice, image and the like or a combination of these.

The electronic police devices 20 are used for monitoring and evidencing the illegal passing vehicle and then uploading the suspected violation information obtained by the network communication system to the traffic control center 30. Specifically, each electronic police device 20 comprises a shooting apparatus 21, a factory control host 22, and an image processing module 23, a candid shooting module 24, a vehicle license identification module 25 and a second communication module 26 which are respectively connected with the factory control host 22, wherein the shooting apparatus 21 is connected with the image processing module 23. In the implementation process, the second communication module 26 can also adopt any one module of the fiber-optic network module, the ADSL wired network module, GPRS/CDMAIX and the wireless communication module of other channels for communication so as to upload the obtained suspected violation information to the traffic control center 30. When the vehicle is suspected of breaking the law and regulations, the shooting apparatus 21 is started for taking pictures of the illegal vehicle and sending the pictures to the vehicle license identification module 25. After the vehicle license identification module 25 extracts vehicle plate information from the pictures, the location information of the electronic police devices 20 together with complete and effective suspected vehicle violation information such as plate number of illegal vehicle, violation time and the like are sent to the traffic control center 30 and stored into the database of the traffic control center 30.

The traffic control center 30 has a background service computer center and a database, used for receiving, analyzing and judging the suspected vehicle violation information uploaded by the electronic police devices 20 and the identification information inputted by the user terminal devices 10, storing the information into the database of the traffic control center 30 and also sending related notification, reminding and evidencing information to the user terminal devices 10 according to the analysis and judgment condition.

During use, a plurality of electronic police devices 20 are fixedly or movably arranged on traffic road monitoring points. The number of the electronic police devices 20 is determined according to actual needs. The electronic police devices 20 are used for detecting passing vehicles, evidencing the illegal vehicle and uploading and storing complete suspected vehicle violation information including the plate information of the illegal vehicle into the database of the background service computer center of the traffic control center 30 through the first communication module 12.

A plurality of user terminal devices 10 can be onboard installed or arranged in relatively fixed places of the vehicle owner (or manager), and can also be carried by the driver and the vehicle owner (or manager) in a portable form. The number of the user terminal devices 10 is determined according to actual needs. The identity information of the driver and the vehicle owner can be inputted into the user terminal devices 10 through input apparatuses such as keyboards, images and the like or the original record is changed according to use needs and change. New identity information of the driver and the vehicle owner is inputted or updated, and then uploaded and stored into the database of the traffic control center 30 through the first communication module 12.

The electronic police devices 20 arranged on the traffic road monitoring points take candid photos for all kinds of suspected passing vehicles breaking the law and regulations. The background service computer center of the traffic control center 30 compares the candid plate information of the illegal vehicle with the information stored in advance into the databases by the driver and the vehicle owner in real time. If the information is found to be matched, the information of notification and confirmation is sent to the user terminal devices 10 of the driver and the vehicle owner immediately through the second communication module 26. The driver and the vehicle owner can also feed back the information to the background service computer center of the traffic control center 30 in time through the user terminal devices 10.

The present invention not only can enable the parties to know the traffic violation records on the spot, to be warned, corrected and educated in time and to effectively exercise their rights of statement and argument, but also can enable the traffic control department to confirm the specific driver breaking the law as soon as possible, to prevent the condition of finding the substitute to accept the punishment from occurring, to be more people-oriented, to enhance the consciousness, the initiative and the traffic safety legal awareness of complying with traffic regulations for traffic participants, to form a favorable traffic atmosphere, to prevent road traffic violations and traffic accidents from occurring, and to achieve the effects of effective management and suppression on the traffic violation behaviors.

2. The difference between this embodiment and embodiment 1 is that this embodiment also comprises an auxiliary light source 27 and an auxiliary light source control module 28 which is connected with the factory control host 22, wherein the auxiliary light source 27 is connected with the auxiliary light source control module 28. Therefore, the electronic police devices 20 can also take pictures under the assistance of the auxiliary light source 27 according to the current ambient temperature so that the recorded and candid image information is clearer.

3. With reference to embodiment 1, in the process of inputting the identification information of the driver, the vehicle owner and the vehicle into the user terminal devices 10, the system of real time notification and confirmation for vehicle traffic violations in the embodiment of the present invention can also comprise a user identity information card 40 on which the identification information of the driver and the vehicle owner is recorded, and the information input module 13 reads the identification information recorded on the user identity information card 40 and then uploads the identification information to traffic control center 30 for performing registration or cancellation. In this way, the user can record the identification information in advance into the user identity information card 40. During use, the user identity information card 40 is inserted into a card slot of each user terminal device 10 for performing automatic identification and input or changing the original record. It is more convenient for use.

Figure 4:
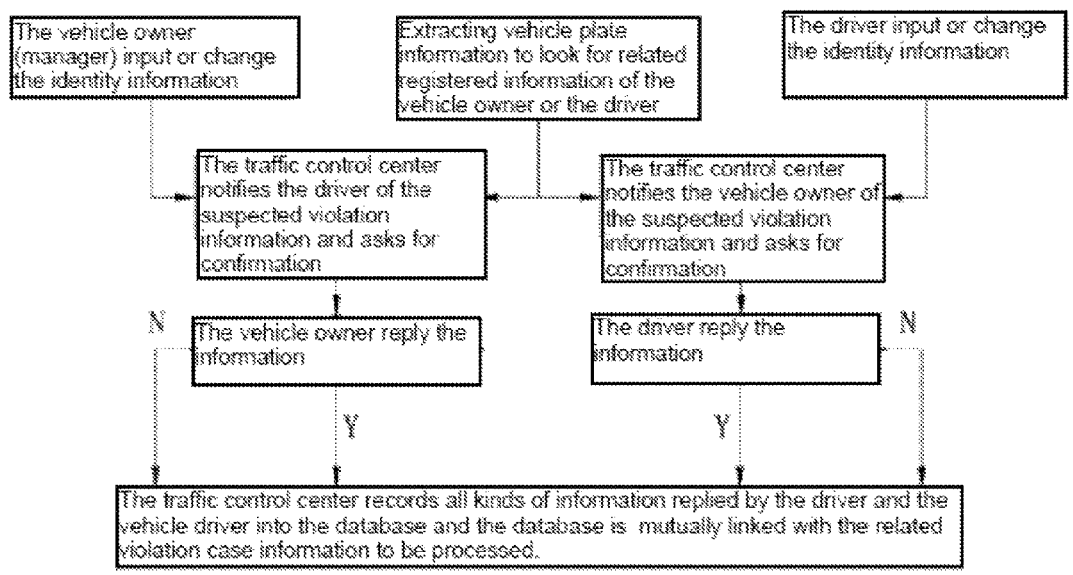
FIG. 4 is a schematic diagram of a process of a method of real time notification and confirmation for vehicle traffic violations according to the present invention.

4. As shown in FIG. 4, the method of real time notification and confirmation for vehicle traffic violations in the embodiment of the present invention comprises the following steps:

The identification information of the driver, the vehicle owner and the vehicle is inputted by the user terminal devices 10; and then, the identification information is uploaded to the traffic control center 30 by the first communication module 12 for performing registration or cancellation. Specifically, the vehicle owner uses the user terminal devices 10 or other devices to upload the name, the company and the vehicle plate information of the vehicle owner as well as the correspondence address and the telephone number of the vehicle owner (manager) (which can be updated in time if change exists) to the traffic control center 30 in the modes of self-help, manual help and the like through the forms of the prefabricated user identity information card 40, keyboard input, voice input, image input and the like, and then stores into the database of the traffic control center 30. It is convenient for the traffic control center 30 to accurately identify the identification information of the vehicle owner (manager), such as shape and appearance, voice, special password (e.g., bank network payment, mobile phone payment and the like) and the like.

The electronic police devices 20 monitor and evidence the illegal passing vehicle and then upload the suspected vehicle violation information obtained by the second communication module 26 to the traffic control center 30.

The traffic control center 30 performs matching and contrastive analysis on the received suspected vehicle violation information and the identification information through the background service computer center, transmits the obtained suspected violation information of the suspected illegal vehicle to registered user terminal devices 10 in time if the information is matched, and records the suspected violation information into the database. Specifically, when the electronic police devices 20 find that the vehicle is suspected of breaking the law and regulations, the shooting apparatus 21, the image processing module 23 and the candid shooting module 24 are used for making videos and taking photos to take pictures; and after the vehicle license identification module 25 extracts the vehicle plate information, the background service computer center of the traffic control center 30 can compare the information with the related information in the databases of the vehicle owner and the driver without the need of manually reviewing the completeness of vehicle violation evidence. If the information is matched, the information obtained by the electronic police devices 20, such as license plate number of the suspected illegal vehicle, violation type, violation place, violation time and the like, can be directly sent to the vehicle owner and the driver in time.

After the user terminal devices receive the suspected vehicle violation information, the information to be understood, appealed or confirmed is fed back to the traffic control center in convenient time under the condition of ensuring safety. The traffic control center 30 records and stores the feedback information replied by the user terminal devices 10 into the database, and conducts selective processing on the user according to the replied information. Specifically, after the vehicle owner and the driver pre-registered in the databases of the vehicle owner and the driver of the traffic control center 30 receive the warning of the information such as suspected vehicle violation type, violation place, violation time and the like sent by the traffic control center 30, on the premise of ensuring driving safety, they should give replied information as soon as possible so as to make a reply in time or require exemption because they are irrelevant to the case of the illegal vehicle or argue to finally make confirmation or declamatory intention by viewing evidence information, such as place, time, specific violation behaviors and the like about the case of the illegal vehicle, collected by the electronic police devices 20, in order to avoid mechanical incorrect judgment of the electronic devices. It is more scientific and people-oriented. Moreover, the background service computer center of the traffic control center 30 records the feedback information into the vehicle violation database and establishes related links with the databases of the vehicle owner and the driver, so that it is convenient for the traffic control center 30 to judge reflection timeliness, truth and recognition attitude of the vehicle owner and the driver for the suspected violation behaviors in the future when investigating and prosecuting the suspected violation case of the vehicle and to combine their past violation times, frequency and kinds as an important basis for punishing leniently, alleviating or exempting the vehicle owner and the driver.

5. The difference between this embodiment and embodiment 4 is that the step 3 also comprises: the traffic control center 30 contrasts and judges the information of the driver and the information of the vehicle owner. If the information of the driver is the same as the information of the vehicle owner, the traffic control center 30 sets the user terminal devices 10 as a convenient operating function. If the information of the driver is different from the information of the vehicle owner, the traffic control center 30 records the information of the driver into the corresponding database of the driver, and notifies the vehicle owner of the suspected violation information through the first communication module 12 in time. Specifically, if the driver of the vehicle is changed, a new driver can use the user terminal devices 10 to update the related information in time. The background service computer center of the traffic control center 30 records the related information into the corresponding databases of the vehicle owner and the driver, and notifies the vehicle owner or manager in time through a corresponding communication system so that the vehicle owner or manager knows the condition in the first time to avoid liability dispute. The vehicle owner or manager can also actively change the related information of the driver instead of the new driver in the background service computer center of the traffic control center 30 through own user terminal device 10, and can notify and remind the new driver through the system.

6. The difference between this embodiment and embodiment 4 is that the step 4 also comprises: the traffic control center 30 records and stores all kinds of information replied by the driver and the vehicle owner into the database and the database is mutually linked with the related violation case information to be processed. It is convenient to judge reflection timeliness, truth and recognition attitude of the driver for the suspected violation behaviors in the process of investigating and prosecuting the suspected violation case of the vehicle and the driver and to combine his past violation times, frequency and kinds as an important basis for punishing leniently, alleviating or exempting the vehicle owner and the driver, so as to improve the comprehensive effects of real time interaction and legality for effective management and automatic processing on the traffic violation behaviors.

The present widely used mobile phone of GPRS/CDMAIX wireless communication mode can be used as a portable user terminal device of the vehicle owner (or manager) and the driver. For the identity change of the vehicle owner and the replacement of the driver, the related information can be inputted or the original record can be changed through input apparatuses such as keyboards, pens and the like; and the related information is stored into the information databases of the driver and the vehicle owner of the background service computer system of the traffic control center 30 in the form of short messages, multimedia messages, wechat or network. The system can perform warning and information transfer to the driver and the vehicle owner (or manager) through the mobile phone terminal device in one of modes of text, voice, image and the like. The system can require the vehicle owner (or manager), especially the driver, in the name of traffic police on duty to preferentially adopt any one communication mode that can accurately identify their identity information such as shape and appearance, voice, special password and the like to feed back the information to be understood, appealed or confirmed to the traffic control center. The system can also combine the installed electronic police devices having the functions of automatically searching onboard mobile phone signals of the vehicle and determining the mobile phone number so as to actively send the related information of notification, reminding, evidencing and the like or recommend and guide the vehicle owner (or manager) and the driver holding the mobile phone not added to the system to input or register the change as soon as possible.

In conclusion, the system and the method of real time notification and confirmation for vehicle traffic violations in the present invention will be described as below in details.

On the end of the user terminal devices 10, the following steps are mainly executed:

U21. The driver and the vehicle owner (manager) input or change the information.

U22. The driver and the vehicle owner (manager) receive the suspected vehicle violation information to be replied from the traffic control center 30, and on the premise of ensuring traffic safety, first raise an objection or perform confirmation with respect to an illegal subject (vehicle or person).

U23. The driver and the vehicle owner (manager) can also reply to the traffic control center 30 that the related evidence should be viewed in another time so as to perform confirmation or argument.

U24. The driver and the vehicle owner (manager) can also reply to the traffic control center 30 that the related evidence should be viewed immediately on the spot so as to perform confirmation or argument.

U25. The driver and the vehicle owner (manager) view immediately the related evidence on the spot, and can also reply to the traffic control center 30 that confirmation or argument will be performed in another time.

U26. The driver and the vehicle owner (manager) give a reply on the spot to put forward other opinions.

On the end of the electronic police devices 20 (e.g., overspeed electronic police), the following steps are mainly executed:

P11. Reading the operation parameters of the overspeed electronic police, such as speed limit $V_i$, place, lane number and the like.

P12. Enabling the vehicle detecting function.

P13. Judging whether vehicles pass through the current lane or not; if so, entering step P14 if not, returning to step P12.

P14. Enabling the speed measurement function to obtain the current speed $V_o$.

P15. Judging whether Vo is greater than Vi or not; if so, it indicates that the vehicle is driving over the speed limit; entering step P16, if not, returning to step P12.

P16. Enabling the image processing module 23, the auxiliary light source control module 28 and the vehicle license identification module 25.

P17. Enabling the candid shooting module 24 to generate an overspeed violation record, including the information of pictures, license plate number, violation place, violation time, speed and the like of the illegal vehicle.

P18. Uploading the overspeed violation record into the vehicle violation database.

On the background service computer center end of the traffic control center 30, the following steps are mainly executed:

E31. Extracting the vehicle plate information or other vehicle identification information of the suspected illegal vehicle, contrasting with the information reserved in the databases of the vehicle owner and the driver in real time, and if a matching record is found, then:

E32. Sending the notification and inquiry information (e.g.: Your vehicle (you drive) having license plate xxx has a traffic violation behavior recorded by the traffic technical monitoring devices in the following time and place. If there is any objection, please propose statement and argument. Give a replay after receiving it!) respectively to the vehicle owner (manager) and the driver of which the suspected vehicle violation is recorded, and meanwhile, requiring the vehicle owner (manager) and the driver to preferentially adopt the form that most proves own identity (according to the order of own on-the-spot driving video, voice and specific mobile phone number identical with the features stored and filed in the traffic control department) to give a reply.

E33. If the vehicle owner (manager) replies to deny that the vehicle breaks the law (regulations), the system will remind the vehicle owner (manager) to pay attention to vehicle management and traffic safety and will input passing information into the related database of the system. If the driver replies to deny that the vehicle he drives breaks the law (regulations), the system will remind the driver to pay attention to traffic safety and change the registration information in time, and will input the passing information into the related database of the system.

E34. If the vehicle owner (manager) replies that the related evidence should be viewed in another time so as to perform confirmation or argument, the system will remind the vehicle owner to pay attention to traffic safety and process the violation in time, and will input the passing information into the related database of the system. If the driver replies that the related evidence should be viewed in another time so as to perform confirmation or argument, the system will remind the driver to pay attention to traffic safety and process the violation in time, and will input the passing information into the related database of the system.

E35. If the vehicle owner (manager) replies and requires to view immediately the related evidence so as to perform confirmation or argument, the system will remind the vehicle owner to pay attention to traffic safety, and will simultaneously send the information of pictures, videos and the like about breaking the law (regulations). If the driver replies and requires to view immediately the related evidence so as to perform confirmation or argument, the system will remind the driver to pay attention to traffic safety, and will simultaneously send the information of pictures, videos and the like about breaking the law (regulations).

E36. if the vehicle owner (manager) and the driver reply to perform confirmation about breaking the law (regulations) after viewing the related evidence, the system will remind them to pay attention to traffic safety and process the violation in time according to related regulations, and will input the passing information into the related database of the system.

E37. If the vehicle owner (manager) and the driver reply not to perform confirmation about breaking the law (regulations) and propose argument on the spot after viewing the related evidence, the system will remind them to pay attention to traffic safety and process the violation in time according to related regulations, and will input the passing information into the related database of the system.

E38. Whether the vehicle owner (manager) and the driver perform spot confirmation or argument or not, the system inputs all the passing information including the replies of the driver and the vehicle owner (manager) into the traffic control information system, and mutually links the databases of the suspected violation information of the driver, the vehicle owner and the vehicle with the related violation case information to be processed.

The present invention not only can enable the parties to effectively know the suspected traffic violation records on the spot, to be warned and corrected in time, to facilitate the parties in effectively exercising their rights of statement and argument and to better accept reasonable punishment imposed by the traffic control department, but also can help the traffic control department to confirm the specific driver who breaks the law as soon as possible to prevent the condition of finding the substitute to accept the punishment, known as "buying points", from appearing. The present invention provides adequate technical support for the punishment conditions of warning, exemption, lenient punishment or alleviation and the like given by the traffic control department in accordance with the law with respect to the first violation, casual violation and minor circumstance, not affecting road passage, caused by possible objective factors such as unclear instruction, unknown road conditions and the like. The present invention comprehensively enhances the educational function, the efficiency and the equity of law enforcement, effectively prevents and reduces the generation of road traffic violations and traffic accidents, and embodies the effect of strengthening management and suppression on the traffic violation behaviors.

The embodiments of the present invention are described above. It should be noted to those skilled in the art that several improvements and polishing can also be made without departing from the principle of the present invention. These improvements and polishing are also considered within the protective scope of the present invention.

What is claimed is:

1. A method of real time notification and confirmation for vehicle traffic violations, comprising:
   inputting identification information of a driver, a vehicle owner and a vehicle by a user terminal device;
   uploading the identification information to a traffic control center by a network communication system to perform a registration or a cancellation;
   uploading a name, a company and vehicle plate information of the vehicle owner as well as a correspondence address and a telephone number of the vehicle owner to the traffic control center through a form selected from a group consisting of a prefabricated user identity information card, a keyboard input, a voice input, an image input;

storing the name, the company and vehicle plate information of the vehicle owner as well as the correspondence address and the telephone number of the vehicle owner in a database of the traffic control center; wherein the name, the company and the vehicle plate information of the vehicle owner as well as the correspondence address and the telephone number of the vehicle owner are updated in time if a change exists to enable the traffic control center to accurately identify the identification information of the vehicle owner;

monitoring and evidencing an illegal passing vehicle by an electronic police device;

uploading obtained suspected violation information to the traffic control center through the network communication system;

performing a matching and a contrastive analysis on received suspected vehicle violation information and the identification information through a background service computer center in the traffic control center without a need of manual review;

transmitting the obtained suspected violation information of a suspected illegal vehicle to a registered user terminal device in real time;

recording the suspected violation information into a database;

making videos and taking photos through a shooting apparatus, an image processing module and a candid shooting module when the electronic police device finds that a vehicle is suspected of breaking the law and regulations;

extracting the vehicle plate information of, the vehicle by a vehicle license identification module;

comparing, the vehicle plate information with the related information in the database of the vehicle owner and the driver by the background service computer center of the traffic control center without the need of manual review of a completeness of a vehicle violation evidence;

if the information is matched, sending information obtained by the electronic police device directly to the vehicle owner and the driver in time, wherein the information includes a license plate number of the suspected illegal vehicle, a violation type; a violation place, and a violation time;

contrasting and judging the information of the driver and the information of the vehicle owner by the traffic control center;

if the information of the driver is the same as the information of the vehicle owner, setting the user terminal device with a function of convenient operating by the traffic control center;

if the information of the driver is different from the information of the vehicle owner, notifying the vehicle owner and driver with suspected vehicle violation information in the same time through a corresponding communication system and recording related information into the database of the vehicle owner and the driver by the traffic control center;

after the user terminal device receives the suspected vehicle violation information, feeding information to be understood, appealed or confirmed back to the traffic control center by the driver and vehicle owner;

recording and storing feedback information replied by the user terminal device into the database by the traffic control center;

after the vehicle owner and the driver pre-registered in the database of the vehicle owner and the driver of the traffic control center receives a warning for the information of a suspected vehicle violation type, the violation place, the violation time sent by the traffic control center, on the premise of ensuring, driving safety, giving replied information as soon as possible to reply in time or require an exemption because they are irrelevant to a case of the illegal vehicle or argue to finally make a confirmation or a declamatory intention by viewing evidence information of place, time, specific violation behaviors about the case of the illegal vehicle, collected by the electronic police device, in order to avoid a mechanical incorrect judgment of an electronic device;

recording the feedback information into a vehicle violation database and establishing a related link with the databases of the vehicle owner and the driver by the background service computer center of the traffic control center to enable the traffic control center to judge reflection timeliness, truth and recognition attitude of the vehicle owner and the driver for the suspected violation behaviors in the future when investigating and prosecuting the suspected violation case of the vehicle and to combine their past violation times, frequency and kinds as an important basis for punishing leniently, alleviating or exempting the vehicle owner and the driver.

2. The method of claim 1, further comprising:

recording and storing all kinds of information replied by the driver and the vehicle owner into the database by the traffic center; and linking the database with related violation case information to be processed, mutually.

* * * * *